(12) United States Patent  
Marr

(10) Patent No.: US 7,509,334 B2
(45) Date of Patent: Mar. 24, 2009

(54) METHODS, SYSTEMS AND COMPUTER PROGRAM PRODUCTS FOR SEGMENTED PRESENTATION OF SERVICE ORDER STATUS INFORMATION

(75) Inventor: Gary William Marr, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 217 days.

(21) Appl. No.: 11/566,466

(22) Filed: Dec. 4, 2006

(65) Prior Publication Data

US 2007/0100876 A1 May 3, 2007

Related U.S. Application Data

(63) Continuation of application No. 10/704,944, filed on Nov. 10, 2003, now Pat. No. 7,146,378.

(51) Int. Cl.
*G06F 17/00* (2006.01)
(52) U.S. Cl. .................. 707/101; 707/102; 707/103 R; 707/104.1
(58) Field of Classification Search ............... 707/1–10, 707/100–104.1, 200–206
See application file for complete search history.

(56) References Cited

U.S. PATENT DOCUMENTS

| 2001/0000808 A1 | 5/2001 | Lesley |
| 2004/0088650 A1 | 5/2004 | Killen et al. |
| 2004/0249691 A1* | 12/2004 | Schell et al. .................. 705/8 |

OTHER PUBLICATIONS

Rule 132 Declaration of Gary Marr, dated Nov. 4, 2003.

* cited by examiner

*Primary Examiner*—Isaac M Woo
(74) *Attorney, Agent, or Firm*—Myers Bigel Sibley & Sajovec

(57) ABSTRACT

The status of a plurality of service orders is summarized. A first data set that includes a plurality of records corresponding to service orders, such as requests for initiation of telephone or other communications services, is imported into a database application. At least one query or test may be executed on the first data set to generate a second data set that includes at least part of the first data set and one or more labels that have been appended to at least some of the plurality of records in the first data set. This second data may be imported into a spreadsheet application so that the spreadsheet application can automatically generate a summary of at least some of the data contained in the second data set.

19 Claims, 8 Drawing Sheets

| Subs Due date | proc | type | Operator number | status | ... | Sw Npa nxx | Work code | Ac ind | seg | Telephone number | exch | App date | Order number | Due Date orig | prn |
|---|---|---|---|---|---|---|---|---|---|---|---|---|---|---|---|
| | FLJ | P | QOF2M | AO | ... | 407240 | M | Y | N | 407 582-0123 | ORSL | 8/8/2001 | TYDM9XXX | 8/9/2001 | |
| | FLJ | A | ROA9A | HN | ... | 904731 | O | N | N | 904 739-4123 | JXS | | DYCG1XXX | | |
| | FLF | A | QOFRH | HN | ... | 954472 | O | N | N | 954 424-7123 | PLTN | | DR34PXXX | | |
| | FLJ | A | ROA9A | HN | ... | 904731 | O | N | N | 904 733-9123 | JXS | | DY70GXXX | | |
| | FLF | P | YOES0 | AO | ... | 561383 | M | Y | N | 561 383-5123 | GAC | 4/29/2002 | TRDFPXXX | 5/1/2002 | |
| | TNS | P | BOK6D | AO | ... | 423870 | M | Y | N | 423 877-3123 | CHAT | 8/20/2002 | T92TWXXX | 9/3/2002 | |
| | TNS | A | WAB6C | HN | ... | 615883 | M | Y | N | 615 365-4123 | NVE | | N93G8XXX | | |
| 3/17/2003 | TNS | P | EFE48 | PF | ... | 423892 | O | N | Y | 423 894-0123 | CHAT | 11/21/2002 | N96C0XXX | 12/5/2002 | $8RU-TCW0120 |
| | FLF | A | OOE3Q | HN | ... | 954581 | O | N | N | 954 581-0123 | PLTN | | TRFNXXXX | | |
| 2/17/2003 | TNS | C | EFE50 | CP | ... | 615242 | O | N | N | 615 726-0123 | NVC | 1/28/2003 | N95L9XXX | 2/3/2003 | $8RU-TLC0128FSAU |
| | LSA | A | YADPD | HN | ... | 504831 | M | Y | N | 504 834-9123 | NOM | | D5BCXXXX | | |
| | CCH | C | QFF7E | CP | ... | 704378 | O | N | Y | 704 535-7123 | CTS | 1/28/2003 | NX3KJXXX | 2/10/2003 | $9RU-TPS0122ITPM |
| 2/5/2003 | FLF | C | QAAK2 | CP | ... | 561368 | O | N | N | 561 392-6123 | BOCA | 1/8/2003 | NRG0QXXX | 1/27/2003 | $9RU-TPS0129INVE |
| | GAA | C | OOE1X | CP | ... | 404691 | O | N | N | 404 505-7123 | ATLA | 1/28/2003 | NOFPMXXX | 2/3/2003 | $8RU-TTS0128AXX |
| | ... | | | | ... | | | | ... | | | | | : | |
| | FLJ | C | YAJ6Q | CP | ... | 407380 | O | N | N | 407 277-0123 | ORS | 1/13/2003 | NY0RQXXX | 2/3/2003 | $9RU-TTW0123TPM |
| | CCH | C | QAAKA | CP | ... | 704523 | O | N | N | 704 529-5123 | CTS | 1/14/2003 | NXCBFXXX | 2/5/2003 | $8RU-TLC0124 |
| | GAA | C | XOCGH | CP | ... | 404284 | O | N | N | 404 343-1123 | ATLE | 1/28/2003 | NO5Y7XXX | 2/4/2003 | $9RU-TTW0128AXX |
| | FLJ | C | OOE1K | CP | ... | 904268 | O | N | N | 904 292-0123 | JXS | 1/28/2003 | NY891XXX | 2/4/2003 | $8RU-TLZ0128IAXX |
| | ALA | O | ROABE | AO | ... | 205991 | O | N | N | 205 271-2123 | BHMS | 2/11/2003 | N1FLYXXX | 2/11/2003 | $3CL-XXX0212IMDU |
| 2/26/2003 | GAA | C | BAASC | CP | ... | 404523 | O | N | N | 678 999-9123 | ATLD | 1/22/2003 | NOB14XXX | 2/10/2003 | $3FO-TPL0225INKH |
| 2/17/2003 | FLF | C | EOS3W | CP | ... | 954581 | O | N | N | 954 797-6123 | PLTN | 1/17/2003 | NRFWNXXX | 1/30/2003 | $8RU-TRF0128IAXX |

FIGURE 3

| BBSOfc | Sm Bus Ofc | Consumer Ofc | COU | ... | EUMTeam | Other Or Null PRN | Order Stage | prn | Subs Due date | proc | ... |
|---|---|---|---|---|---|---|---|---|---|---|---|
| BBS | SmBus | | SmBus | ... | | OtherOrNull | OtherOrNull | | | TNS | ... |
| | | | BBS | ... | 8RU | | 8RU | $8RU-TCW0120 | 3/17/2003 | TNS | ... |
| | | Consumer | Consumer | ... | 3CL | | 3CL | $3CL-XXX0212IMDU | | ALA | ... |
| | | Consumer | Consumer | ... | 3CL | | 3CL | $3CL-XXX0212IMDU | | ALA | ... |
| BBS | | | BBS | ... | 3CL | | 3CL | $3CL-TWG0307CMET | | FLJ | ... |
| | | Consumer | Consumer | ... | 3CL | | 3CL | $3CL-XXX0212IMDU | | ALA | ... |
| BBS | | | BBS | ... | 8RU | | 8RU | $8RU-TTS0311IKMM | 3/31/2003 | GAM | ... |
| | SmBus | | SmBus | ... | 8RU | | 8RU | $8RU-TMT0312IDLJ | 3/18/2003 | FLM | ... |
| | SmBus | | SmBus | ... | 4FO | | 4FO | $4FO-TEP0313FUSH | | TNS | ... |
| BBS | | | BBS | ... | | OtherOrNull | OtherOrNull | KIAWAHCENTREX | 2/27/2003 | CCO | ... |
| | SmBus | | SmBus | ... | 3FO | | 3FO | $3FO-TSN0304FNVE | | GAA | ... |
| BBS | | | BBS | ... | | OtherOrNull | OtherOrNull | KIAWAHCENTREX | 2/27/2003 | CCO | ... |
| BBS | | | BBS | ... | 8PR | | 8PR | $8PR-XXX0312IDLT | | ALA | ... |
| | SmBus | | SmBus | ... | 8RU | | 8RU | $8RU-TCW0312IFDW | 3/19/2003 | GAA | ... |
| | SmBus | | SmBus | ... | 8RU | | 8RU | $8RU-XXX0313 | 4/7/2003 | ALA | ... |
| | | Consumer | Consumer | ... | 2CL | | 2CL | $2CL-TDC0226IAXX | | GAA | ... |
| | | Consumer | Consumer | ... | | OtherOrNull | OtherOrNull | | | FLJ | ... |
| BBS | | | BBS | ... | 9RU | | 9RU | $9RU-TTW0311 | 3/26/2003 | GAM | ... |
| ... | ... | ... | ... | ... | ... | ... | ... | | ... | ... | ... |
| BBS | | | BBS | ... | 3CL | | 3CL | $3CL-TSD0313CTQW | | TNS | ... |
| | SmBus | | SmBus | ... | 8RU | | 8RU | $8RU-TTE0311ITPM | 3/19/2003 | FLM | ... |

FIGURE 5

| COU | OrderStage | prn | Subs Due date | status | order_number | telephone_number | BBSGroup | FOCrcvd | AgeInDays | ... |
|---|---|---|---|---|---|---|---|---|---|---|
| BBS | 3CL | $3CL-TSD0313CTQW | | AO | C9F0XXXX | 901 725-5123 | 5MP | | 204 | ... |
| BBS | 3CL | $3CL-TWG0307CMET | | AO | NY1C9XXX | 904 388-8123 | 5MP | | 221 | ... |
| BBS | 3FO | $3FO-TSD0306INVE | | AO | NR2KWXXX | 561 792-1123 | 2FA | | 207 | ... |
| BBS | 4CK | $4CK-TME0312IKMM | | AO | NP2J9XXX | 706 560-0123 | 5MP | | 190 | ... |
| BBS | 4CK | $4CK-TJR0312IFDW | | AO | NR81LXXX | 954 975-6123 | 5MP | | 190 | ... |
| BBS | 4FO | $4FO-TDR0313FFDW | | AO | NY8KPXXX | 904 642-2123 | 9KJ | | 193 | ... |
| BBS | 4LS | $4LS-TJR0313IFDW | | AO | NR59VXXX | 561 740-3123 | 5MP | | 190 | ... |
| BBS | 8PR | $8PR-XXX0312IDLT | | AO | N16X0XXX | 256 718-1123 | 2FA | | 211 | ... |
| BBS | 8RU | $8RU-TCW0120 | 3/17/2003 | PF | N96C0XXX | 423 894-0123 | 5MP | | 300 | ... |
| BBS | 9PR | $9PR-XXX0312IXPC | | AO | N9576XXX | 615 331-2123 | 5MP | | 207 | ... |
| : | : | : | : | : | : | : | : | : | : | ... |
| Consumer | 2CL | $2CL-TDC0226IAXX | | HN | N00W9XXX | 404 794-8123 | | | 211 | ... |
| Consumer | 2FO | $2FO-TEA0306IAXX | | AO | N00WGXXX | 770 222-1123 | | | 198 | ... |
| Consumer | 3CL | $3CL-XXX0212IMDU | | AO | N130XXXX | 205 271-2123 | | | 218 | ... |
| Consumer | 3CL | $3CL-XXX0212IMDU | | AO | N1FLYXXX | 205 271-2123 | | | 218 | ... |

| COU | (All) |
| BBSGroup | (All) |
| PendingClarification | (All) |
| FOCrcvd | (All) |
| GreaterThan30DaysOld | (All) |
| NewOrdersNotConvertedTd | (All) |

380

| Count of order_number | | status | | | | |
|---|---|---|---|---|---|---|
| OrderStage | OrderStage2 | AO | HN | PD | PF | Grand Total |
| FrontEndProcessing | 2CL | | 1 | | | 1 |
| | 2FO | | 1 | | | 1 |
| | 3CL | | 5 | | | 5 |
| | 3FO | | 4 | | | 4 |
| | 4CK | | 3 | | | 3 |
| | 4CL | | 1 | | | 1 |
| | 4FO | | 4 | | | 4 |
| | 4LS | | 2 | | | 2 |
| BackEndProcessing | 8PR | 2 | | | 1 | 3 |
| | 8RU | | | | 11 | 12 |
| | 9PR | | 1 | | | 1 |
| | 9RU | | | | 3 | 3 |
| Holding | Holding | | | 2 | | 2 |
| OtherOrNull | OtherOrNull | 1 | | 2 | 4 | 7 |
| ReferralPRN | ReferralPRN | 2 | | 1 | | 3 |
| RNSROScoded | RNSROScoded | | | 2 | | 2 |
| Grand Total | | 26 | | 8 | 19 | 54 |

Figure 8

METHODS, SYSTEMS AND COMPUTER PROGRAM PRODUCTS FOR SEGMENTED PRESENTATION OF SERVICE ORDER STATUS INFORMATION

CROSS REFERENCE TO RELATED APPLICATION

This application is a continuation of application Ser. No. 10/704,944, filed Nov. 10, 2003 now U.S. Pat. No. 7,146,378, entitled Methods, Systems and Computer Program Products for Segmented Presentation of Service Order Status Information, to the present inventor, which is assigned to the assignee of the present application, the disclosure of which is hereby incorporated herein by reference in its entirety as if set forth fully herein.

FIELD OF THE INVENTION

The present invention relates to data processing and presentation and more particularly to methods systems and computer program products for summarizing service order information.

BACKGROUND OF THE INVENTION

With increases in the use of computers to collect and store data, there has been a proliferation of databases or "data warehouses" containing large amounts of information. For example, companies that perform services that are processed in multiple stages may maintain databases of the service orders for at least the time period during which the service order is undergoing processing.

The data warehouses containing such service orders often include extensive information regarding each entry or "record" maintained in the data warehouse. Moreover, the data warehouse itself may have a complex structure. Because of this complexity and/or the volume of data, data warehouses are often created, administered and/or maintained by an information technology specialist. As such, modification and/or analysis of data warehouses may be a costly and time consuming process.

For example, with the breakup of AT&T followed by the mandate for competition for local telephone service, many telephone users now switch between different long distance, local and wireless telephone service providers. When a telephone service provider receives an order to initiate service for a new customer (e.g., a customer switching from another telephone service provider) that service order may be maintained in a data warehouse of pending service orders. Switching a customer from one telephone service provider to another may be a complex operation that is processed in a series of steps or "stages" by a plurality of different individuals or groups within the telephone service provider receiving the request for initiation of service. As the service orders are processed, the data warehouse of service orders may be updated to reflect, among other things, the current status of each of the pending orders.

Information regarding the status of the processing of pending service orders may be important to management of the telephone service provider. This information may be used, for example, to monitor the rate at which orders are being processed, identify bottlenecks in order processing and/or to optimize the allocation of corporate resources. However, the status of the service orders is constantly changing and assistance from the information technologists or other individuals that maintain the database may be necessary to assist management in extracting and analyzing the relevant information from the data warehouse. Additionally, the information stored in the data warehouse may be stored using special alphanumeric codes that may make it difficult for management to interpret and/or analyze the raw data in the data warehouse.

SUMMARY OF THE INVENTION

According to embodiments of the present invention, methods of summarizing the status of a set of service orders are provided. A set of service orders, such as requests for initiation of telephone service, is imported into a database application. At least one query or test is executed on the set of service orders to generate a revised set of service orders. The revised set of service orders typically includes a subset of the information from the original set of service orders to which additional information may be appended. The revised set of service orders may be imported into a spreadsheet application so that the spreadsheet application can automatically generate a summary of at least some of the data contained in the revised set of service orders.

In certain embodiments of the present invention, a pivot table is used to provide the summary of the status of the service orders. Input from an end user can be accepted via the spreadsheet application that specifies the portions of the data contained in the second data set that are included in the summary the status of the service orders. The query that is executed may, among other things, append identifying language labels to the original set of service orders to generate the revised set of service orders. Moreover, the summary of the status of the service orders may include a summary of at least two different service parameters.

Other embodiments of the present invention provide computer-based systems for summarizing the status of a plurality of service orders. These systems may include a set of service orders that are stored in memory on the system, along with a computer application, such as a database program, that executes one or more queries or tests on the set of service orders to generate a revised set of service order information. The system may further include a second application, such as a spreadsheet program, that processes data contained in the revised set of service orders to produce a summary of the status of the service orders, along with a computer display device on which this summary may be presented to a user.

As will further be appreciated by those of skill in the art, while described above primarily with reference to method aspects, the present invention may be embodied as methods, systems and/or computer program products. Furthermore, other systems, methods and/or computer program products according to embodiments will be or become apparent to one with skill in the art upon review of the following drawings and detailed description. It is intended that all such additional systems, methods and/or computer program products be included within this description, be within the scope of the present invention, and be protected by the accompanying claims.

BRIEF DESCRIPTION OF THE DRAWINGS

FIG. 3 depicts portions of an exemplary service order data set for illustrating operations according to embodiments of the present invention.

FIG. 5 depicts portions of an exemplary service order data set that is generated from the exemplary service order data set of FIG. 3 for illustrating operations according to embodiments of the present invention.

FIG. 7 depicts portions of an exemplary service order data set that is generated from the exemplary service order data set of FIG. 5 for illustrating operations according to embodiments of the present invention.

FIG. 8 depicts a pivot table for displaying a summary of the status of a plurality of service orders according to embodiments of the present invention.

DETAILED DESCRIPTION

Figure 1:
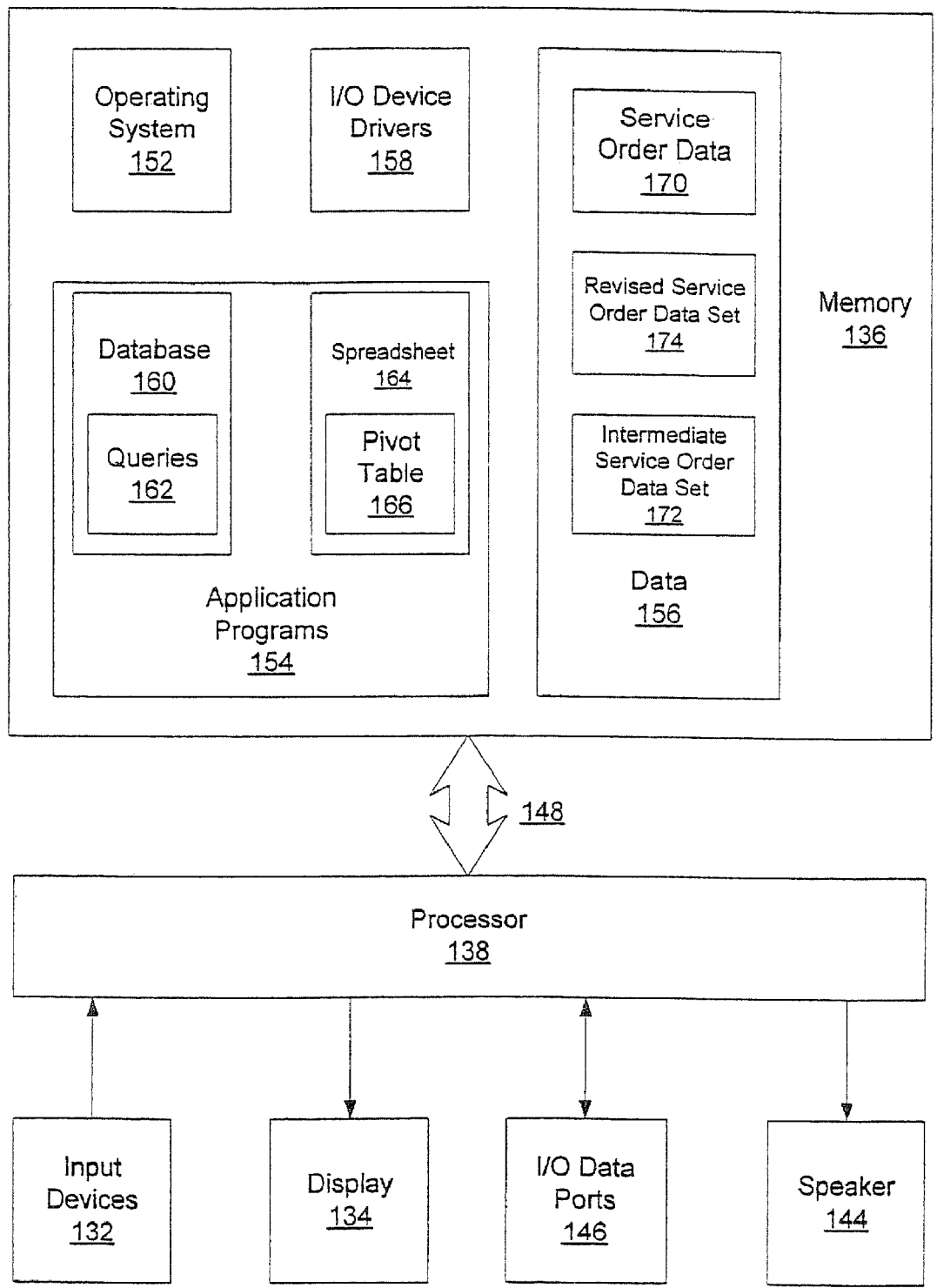
FIG. 1 is a block diagram of a data processing system suitable for use in embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of entirely software embodiments or embodiments combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be implemented using programmable aspects of existing application programs such as, for example, database query functions and spreadsheet pivot table functions. Aspects of the computer program code may also be written in an object oriented programming language such as Java®, Smalltalk or C++ and/or using a conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. FIG. 1 is a block diagram illustrating data processing systems, methods and computer program products 100 in accordance with embodiments of the present invention. The data processing system 100 typically includes input device(s) 132 such as a keyboard or keypad, a display 134, and a memory 136 that communicate with a processor 138 via an address/data bus 148. The processor 138 can be any commercially available or custom microprocessor. The data processing system 100 may further include a speaker 144, and I/O data ports 146 that also communicate with the processor 138. The I/O data ports 146 can be used to transfer information between the data processing system 100 and another computer system or a network. These components may be conventional components, such as those used in many conventional data processing systems, which may be configured to operate as described herein.

The memory 136 is representative of the overall hierarchy of memory devices containing the software and data used to implement the functionality of the data processing system 100. The memory 136 can include, but is not limited to, the following types of devices: cache, ROM, PROM, EPROM, EEPROM, flash memory, SRAM, and DRAM. As shown in FIG. 1, the memory 136 may include several categories of software and data used in the data processing system 100: an operating system 152; application programs 154; input/output (I/O) device drivers 158; and data 156. As will be appreciated by those of skill in the art, the operating system 152 may be any operating system suitable for use with a data processing system, such as OS/2, AIX, System390 or Z/OS from International Business Machines Corporation, Armonk, N.Y., Windows95, Windows98, Windows2000 or WindowsXP from Microsoft Corporation, Redmond, Wash., Unix or Linux. The I/O device drivers 158 typically include software routines accessed through the operating system 152 by the application programs 154 to communicate with devices such as the I/O data port(s) 146 and certain memory 136 components. The application programs 154 are illustrative of the programs that implement the various features of the data processing system 100 and preferably include at least one application which supports operations according to embodiments of the present invention. Finally, the data 156 represents the static and dynamic data used by the application programs 154, the operating system 152, the I/O device drivers 158, and other software programs that may reside in the memory 136.

As is further seen in FIG. 1, the application programs 154 may include a database application 160 and a spreadsheet application 164. The database application 160 may be any conventional database application such as, for example, Microsoft Access, or a custom database application. The database application 160 may also comprise a multi-purpose application that performs conventional database functions. The spreadsheet application 164 may be any suitable spreadsheet application, such as, for example, Microsoft Excel, Lotus 123 or the like or a custom spreadsheet application, and may also comprise a multi-purpose application that includes capabilities for displaying and totaling data.

The data portion 156 of memory 136, as shown in the embodiments of FIG. 1, may include a data set 170 containing information on a plurality of service orders. In embodiments of the present invention, the service order data set 170 may include a table of service orders records, where each record (e.g., row) in the table contains information relating to a specific service order. The service order data set 170 can be input and compiled on the data processing system 100 or may be exported to the processing system 100 from an external data source via, for example, an open data base connectivity ("OBDC") connection.

The data portion 156 of memory 136 may further include a revised service order data set 174. The data portion 156 of memory 136 may also, but need not, include one or more intermediate service order data sets 172. Both the revised service order data set 174 and the intermediate service order data set(s) 172 may comprise modified versions of the service order data set that add, subtract and/or modify the data contained in the service order data set 170. For example, a revised service order data set 174 may include only a subset of the records and/or the fields of information contained in the service order data set 170, and may also append additional information to one or more of the records in the service order data set 170.

As shown in FIG. 1, one or more queries 162 may be implemented in the database application 160. The queries 162 may include a test that is performed on information in the service order data set 170 and/or on information in one of the intermediate service order data set(s) 172. These queries 162 may be used to identify service order records in the service order data sets 170, 172 that satisfy one or more conditions. The queries 162 may also be used to append labels to selected of the service order records. According to embodiments of the present invention, a series of queries 162 may be executed to generate the revised service order data set 174. This revised service order data set 174 includes at least a subset of the records (although not necessarily the entirety of each record) in the service order data set 170 that have been modified to include labels. In certain embodiments, these labels include at least some English language labels (and/or English language acronyms) that have a readily understandable meaning to the persons who are to view the summaries of the status of the service orders.

In particular embodiments of the present invention, the queries 162 may be grouped into a composite query (not shown in FIG. 1) that is executed on the service order data set 170 and/or on one the intermediate service order data sets 172. One or more such composite queries may be executed.

As will be appreciated by those of skill in the art in light of the present disclosure, the use of a composite query may simplify updating the systems and computer program products according to embodiments of the present invention when, for example, the format or possible values of the data in the service order data set 170 change for some reason. Use of a composite query may reduce the amount of reprogramming required to update the system/computer program product after such a change occurs. As will be appreciated by persons of skill in the art, appropriate queries 162 may be generated in many database applications using a design wizard, or they may alternatively be programmed and/or created directly.

As is further shown in FIG. 1, the spreadsheet application 164 may include a pivot table 166. A "pivot table" refers to a reporting tool in a spreadsheet application that sorts and sums a data set independent of how the original data set was input into the spreadsheet. The pivot table 166 may operate on a data set exported from the database application 160 to provide a custom report of information from that data set. The pivot table 166 may also allow the user to select parameters of the status information that is to be summarized and displayed. It will be appreciated, however, that any user configurable display can be used in place of the pivot table 166 to display the summary of the status information to the user via the spreadsheet application 164. Typically, the pivot table 166 will be displayed to the user on the display 134 included in the processing system 100 and/or provided to the user via another output device such as a printer.

While the database application 160, the spreadsheet application 164 and the components of the data portion 156 of memory 136 are illustrated in FIG. 1 as being part of a single data processing system 100, as will be appreciated by those of skill in the art, the illustrated functionality and data may be distributed across one or more data processing systems. For example, the functionality of the database application 160 and the first service order data set 170 may be provided on one or more data processing systems that are separate from the data processing system that provides the functionality of the spreadsheet application 164. It will also be appreciated that various applications could be incorporated into the operating system 152 or some other logical division of the data processing system 100. Thus, the present invention should not be construed as limited to the configuration of FIG. 1, but is intended to encompass any arrangement, division of functions between data processing systems and/or configuration capable of carrying out the operations described herein.

Figure 2:
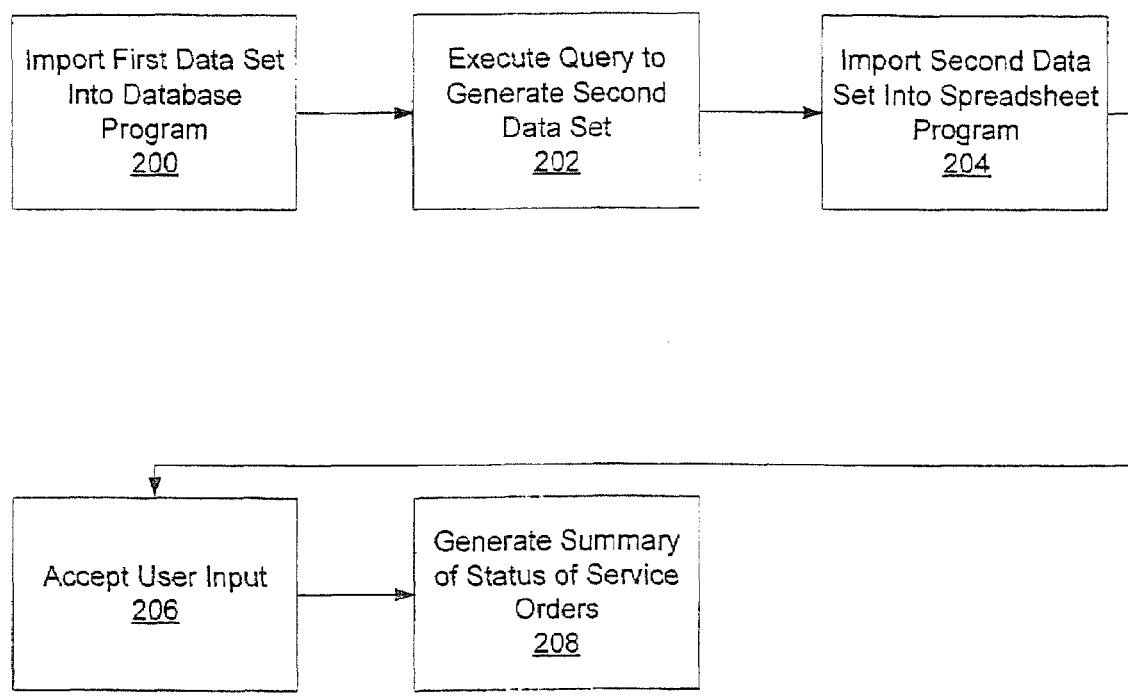
FIG. 2 is a flowchart illustrating operations for summarizing and displaying status information regarding a plurality of service orders according to embodiments of the present invention.

FIG. 2 illustrates operations for summarizing the status of a plurality of service orders pursuant to embodiments of the present invention. As seen in FIG. 2, a data set that includes a plurality of records may be imported into a database program (block 200). At least some of these records may correspond to respective service orders. By "importing" it is meant that the data is made available so that the database program can execute operations on the data. Thus, the data set may be "imported" into the database program by, for example, entering or transferring the data set into a file or table that is linked to the database program. Next, a series of one or more queries are executed on the first data set to generate a second data set (block 202). These queries may all be executed at once, executed one at a time and/or executed in a series of discrete groups of queries. As discussed above, the queries may be used, for example, to identify service order records in the data set that satisfy one or more conditions and/or to append labels to selected of the service order records. The second data set that is created by operation of the queries may, for example, only include the service order records that satisfy various conditions. The records included in the second data set may also include only a subset of the fields from the first data set. The records included in the second data set may further include additional fields that include labels or other information.

As is also shown in FIG. 2, once the second data set is generated it may be imported into a spreadsheet application (block 204). Either before or after the data is imported into the spreadsheet application, the user may, in some embodiments of the present invention, select various portions of the data that are to be summarized (block 206). The spreadsheet application may then be used to display at least some of the data from the second data set in a table that summarizes the status of the service orders (block 208).

Particular embodiments of the present invention will now be described with reference to FIGS. 3 through 8. FIG. 3 illustrates portions of an exemplary data set of service orders. In the embodiments of FIG. 3, the service orders are stored as records in a table, meaning that each row of the table corresponds to a service order. In many instances, each service order may have dozens or even hundreds of fields of information (i.e., columns in the example of FIG. 3), and, as shown, the data contained within the data set is often displayed using abbreviated codes. Ellipsis ( . . . ) are included in the table of FIG. 3 to make clear that the data set may include many additional fields and records.

At least one of the fields in the data set of service orders includes status information relating to the order. For instance, in the exemplary data set of FIG. 3, the second character of the "prn" field records a code indicating the team that is currently processing each particular order and the third and fourth characters record the last stage of the processing that has been completed. Additional status information may also be recorded; for instance, in the exemplary data set depicted in FIG. 3 the "status" field records for each service order the status of the facilities that correspond to the order.

Figure 4:
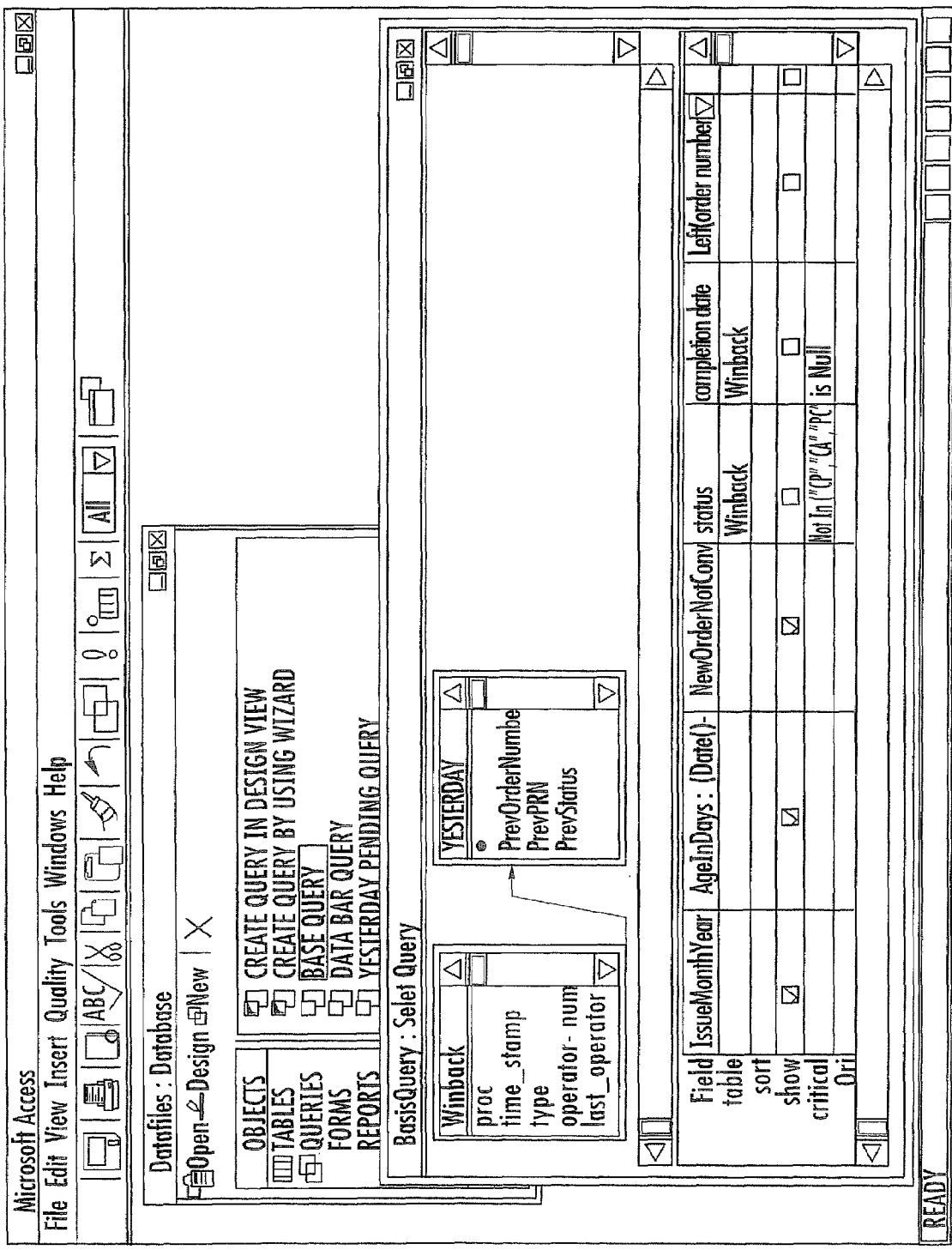
FIG. 4 depicts a composite query implemented in the Microsoft Access database application for illustrating operations according to further embodiments of the present invention.

FIG. 4 depicts a composite query 300 (titled "Basis Query") that has been implemented in the Microsoft Access database application that can be used to operate on a service order data set. The composite query comprises a number of tests that are performed on each record in the service order data set. The full text of the queries included in the composite query of FIG. 4 reads as follows:

SELECT IIf(Left([sales_code],1) In ("1","2","3","4","5","6","7","8","9") And Left([sales_code],3) Not In ("1ZG","4XY","5XY","6XY","7XY","733") And Left([sales_code],2) Not In ("73") And [cent] Not Like "R*" And [cent] Is Not Null,"BBS",Null) AS BBSOfc, IIf((Left([sales_code],1) Not In ("1","2","3","4","5","6","7","8","9") Or Left([sales_code],3) In ("1ZG","4XY","5XY","6XY","7XY")) And [cent] Not Like "R*" And [cent] Is Not Null,"SmBus",Null) AS SmBusOfc, IIf([cent] Not Like "R*" And [cent] Is Not Null And [cent] Like "I*" And ([resh] Like "V*" Or [iresh] Like "V*"),"PayPhone",Null) AS PayPhoneOfc, IIf(Left([sales_code],3) Not In ("5MP","2FA","7CV","9KJ") And [cent] Like "R*" And [cent] Is Not Null And [sales_code]<>"7330039","Consumer",Null) AS ConsumerOfc, [BBSOfc] & [SmBusOfc] & [PayPhoneOfc] & [ConsumerOfc] AS COU, IIf(Left([prn],2) In ("$1","$2","$3","$4","$8","$9") And [cent] Is Not Null,Mid([prn],2,3),Null) AS EUMTeam, IIf((Mid([prn],13,1) In ("C","T","1","2","3")),Mid([prn],13,1),Null) AS SubsequentReferral, IIf([SubsequentReferral] Is Not Null,Mid([prn],14,3),Null) AS RefdTo, IIf(((([prn] Not Like "$*") Or ([prn] Is Null)) And [cent] Is Not Null,"OtherOrNull",Null) AS OtherOrNullPRN, IIf(Left([prn],7) In ("$TRECC-","$SBSWEB","$TRECC-","$SBS ","$SBTC ","$MET ","$CHA ","$FTL ") And [cent] Is Not Null,"RNSROScoded",Null) AS RNSROS, IIf((Left([prn],7) In ("$TRECRI") Or Left([prn],5) In ("$SBSC","$AMCC","$METC","$CHAC","$FTLC","$PSBC")) And Mid([prn],16,1)<>" " And [cent] Is Not Null,"ReferralPRN",Null) AS Referral, IIf((Left([prn],3) In ("$HN") And [cent] Is Not Null),"Holding",Null) AS Holding, IIf([cent] Is Null,"NoCent",Null) AS NoCent, IIf((Left([prn],2) In ("$T") And Mid([prn],5,1) In ("-") And [cent] Is Not Null),"Training",Null) AS Training, IIf([EUMTeam] Is Null And [OtherOrNullPRN] Is Null And [RNSROS] Is Null And [Referral] Is Null And [Holding] Is Null And [NoCent] Is Null And [Training] Is Null,"IncorrectPRN",Null) AS IncorrectPRN, [EUMTeam] & [OtherOrNullPRN] & [RNSROS] & [Referral] & [IncorrectPRN] & [Holding] & [NoCent] & [Training] AS OrderStage, Winback.*, IIf([BBSOfc] Is Not Null,Left([sales_code],3),Null) AS BBSGroup, IIf([FOCrcvd] Is Not Null,[PrevPRN],Null) AS FOCPrevPRN, IIf(Left([PrevPRN],2) In ("$1","$2","$3","$4") And Left([Winback.prn],2) In ("$8","$9") And [PrevStatus] In ("AO"),"FOCrcvd",Null) AS FOCrcvd, IIf(Mid([prn],13,1) In ("1","2","3","4","C","T") And Mid([prn],14,3) In ("SBS","MET","TRE","CHA","FTL","PSB","AMC"),"PendingClarification",Null) AS PendingClarification, IIf([issue_date]<Date( )-30,"GreaterThan30DaysOld",Null) AS GreaterThan30DaysOld, DatePart("yyyy",[issue_date]) & "-" & IIf(DatePart("m",[issue_date]) In (1,2,3,4,5,6,7,8,9),0 & DatePart("m",[issue_date]),DatePart("m",[issue_date])) AS IssueMonthYear, (Date( )-[Winback.issue_date]) AS AgeInDays, IIf((Left([prn],7) In ("$TRECRI") Or Left([prn],5) In ("$SBSC","$AMCC","$METC","$CHAC","$FTLC","$PSBC")) And Mid([prn],16,1)<>" " And [cent] Is Not Null And [prn]-[PrevPRN],"NewOrdersNotConvertedToEUM",Null) AS NewOrdersNotConvertedToEUM FROM Winback LEFT JOIN [YesterdayPending Query] ON Winback.order_number = [YesterdayPending Query].PrevOrderNumber -continued

```
WHERE (((Winback.status) Not In ("CP","CA","PC")) AND
((Winback.completion_date) Is Null) AND ((Left([order_number],1)) In
("N","C")));
```

These queries test the records in the service order data set to determine if various conditions are met and, if so, an action may be taken, such as creating a new field in the record and populating that field with a label or other information. In this manner, the composite query 300 generates a revised service order data set that includes a subset of the records from the original service order data set, namely the records that were selected by the tests included within the composite query 300. Portions of the revised service order data set generated by executing the composite query 300 on the service order data set of FIG. 3 are depicted in FIG. 5. The revised data set may also include fields corresponding to one or more of the tests in the composite query 300, and service order records that passed a particular test may be labeled by including an appropriate indicator in the corresponding field. In particular embodiments of the present invention the label may be an English language label that will have meaning to viewers of the summary of the status of service orders.

Figure 6:
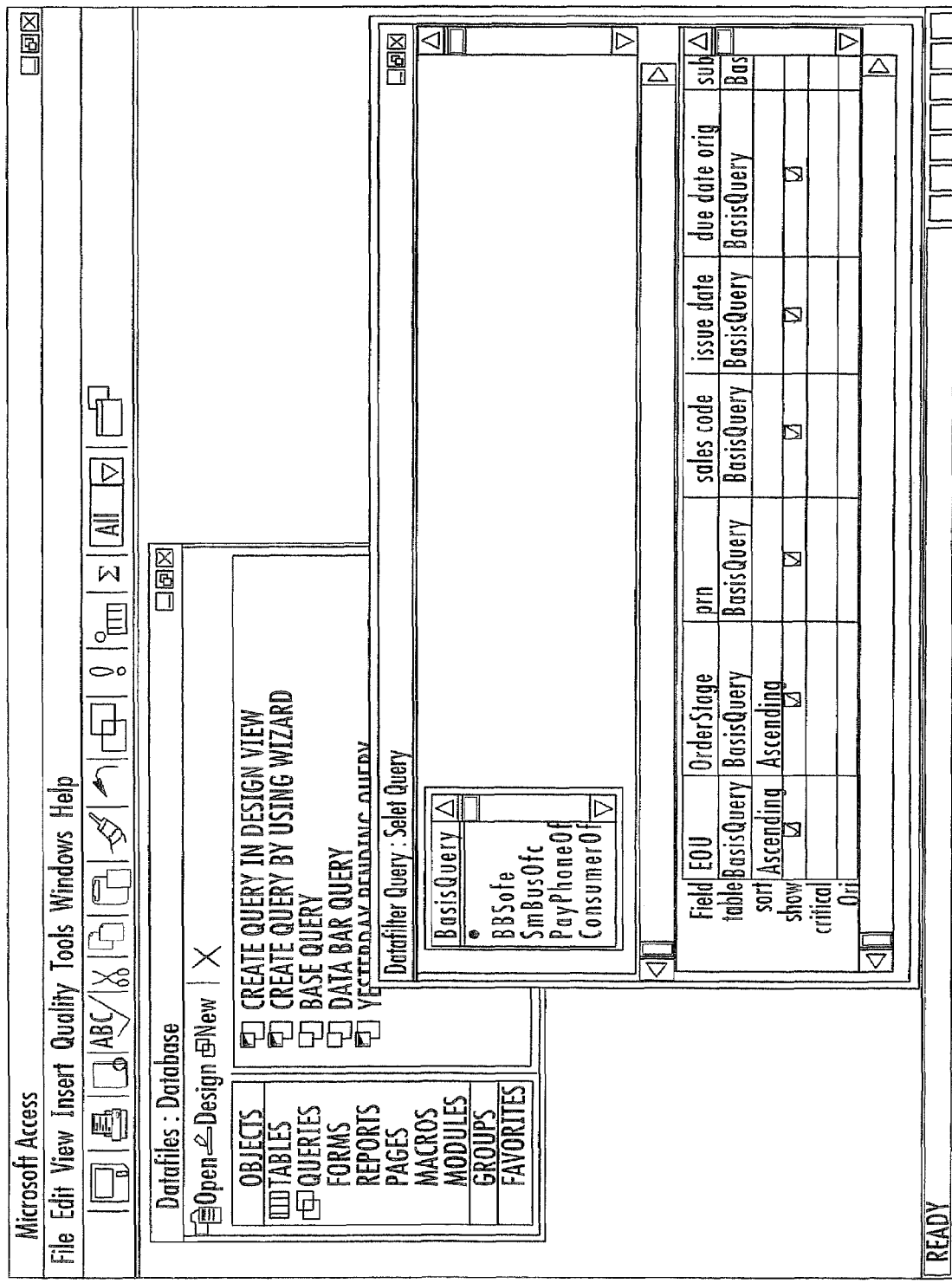
FIG. 6 depicts another query implemented in the Microsoft Access database application for illustrating operations according to further embodiments of the present invention.

As discussed above, pursuant to certain embodiments of the present invention more than one composite query may be used in preparing the summary of the status of the service orders. FIG. 6 illustrates such a second composite query 320 (the "Data Filter" query). The full text of the Data Filter query 320 depicted in FIG. 6 is as follows:

```
Query.COU, BasisQuery.OrderStage, BasisQuery.prn,
BasisQuery.sales_code,
BasisQuery.issue_date, BasisQuery.due_date_orig,
BasisQuery.subs_due_date, BasisQuery.status,
BasisQuery.order_number,
BasisQuery.telephone_number, BasisQuery.cent,
BasisQuery.SubsequentReferral, BasisQuery.RefdTo,
BasisQuery.BBSGroup,
BasisQuery.FOCrcvd, BasisQuery.PendingClarification,
BasisQuery.GreaterThan30DaysOld, BasisQuery.IssueMonthYear,
BasisQuery.AgeInDays, BasisQuery.supp AS NumOfSDDsupps,
BasisQuery.NewOrdersNotConvertedToEUM
FROM BasisQuery
ORDER BY BasisQuery.COU, BasisQuery.OrderStage;
```

In the embodiments of the invention illustrated in FIGS. 3 through 8, the second composite query 320 may be executed on the revised service order data set of FIG. 5. The Data Filter query 320 illustrated in FIG. 6 produces a final service order data set by removing information from the revised service order data set of FIG. 5. In particular, various fields in the revised service order data set that are not required in the generation of the summary (discussed below) are deleted. The Data Filter query 320 also reorders the service order records. FIG. 7 depicts portions of the final service order data set that is generated when the Data Filter query 320 of FIG. 6 is executed on the intermediate service order data set of FIG. 5.

FIG. 8 depicts a pivot table 350 that may be used to operate on the final service order data set of FIG. 7 to produce a summary of the status of the service orders according to embodiments of the present invention. The exemplary pivot table 350 depicted in FIG. 8 was generated using the Microsoft Excel spreadsheet application. This pivot table operates on the data in the final service order data set that has been downloaded from the database application into the spreadsheet application. As shown in FIG. 8, the pivot table has two components, an upper table 360 and a lower table 380. The upper table 360 includes a plurality of user-selectable menus that determine what portions of the data in the final service order data set are tallied and presented in the status report contained in the lower table 380 of the pivot table 350.

The exemplary pivot table 350 in FIG. 8 displays status information regarding telephone initiation service orders. The telephone initiation service orders belong to one of a plurality of Customer Operating Units ("COU"). Thus, by using the pull-down menu labeled "COU" in the upper table 360 of the pivot table 350 an end user may choose to view information that summarizes all of the pending telephone initiation service orders or, alternatively, may choose to view only those telephone initiation service orders that correspond to a particular Customer Operating Unit such as the Big Business ("BBS") unit. As shown, in FIG. 8, the pivot table may include a plurality of user selectable options that allow the end user to quickly and easily display a summary status report that contains the information that is of particular interest to them. For instance, in the example of FIG. 8 the end user may use the COU and BBSGroup menus together to choose to view only service orders from a particular subgroup of the Big Business Customer Operating Unit. Other choices available to the end user in the upper table 360 of pivot table 350 of FIG. 8 are to only view service orders that (1) are pending clarification, (2) have received a firm order confirmation, (3) were originated more than 30 days ago or (4) orders that have not yet been converted for processing.

The lower table 380 in the pivot table 350 of FIG. 8 displays the total number of pending service orders that are in various stages of processing. In the example of FIG. 8, a service order may be in one of a total of nine different stages of processing, namely, CL, FO, CK, LS, PR, RU, Holding, ReferallPRN or RNSROScoded. There are also a plurality of teams (labeled 2, 3, 4, 8 and 9 in FIG. 8) that may be processing a particular service order. For each team and order stage the lower table 380 of pivot table 350 identifies the total number of service orders that each team has in each processing stage. The lower table 380 of the pivot table 350 further breaks out another item of information for each team and order processing stage, namely the "status" of the order. As shown in FIG. 8, a service order may have a status of AO, RN, PD or PF, and the pivot table 350 breaks out the number of service orders having each status for each combination of team and order processing stage.

The end user may also retrieve information regarding any of the service orders that are listed in the lower table 380 of the pivot table 350 by double clicking on any cell in the lower table 380 of the pivot table 350 that specifies the number of service orders in a particular stage of processing. The selection of the cell calls tip the entire record in the final data set that corresponds to each service order that is in that particular stage of processing. This feature allows the end user to obtain additional information regarding particular service orders without having to access the entire underlying data set.

A "Yesterday" query capability may also be included in the database program. This Yesterday query feature allows a user to take a snapshot of the status of service orders on a daily basis so that comparisons may be performed that demonstrate how the status of the service orders changes over time.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A computer-based method of summarizing the status of a plurality of telecommunications service initiation orders, the method comprising:
    compiling a first data set that includes a plurality of telecommunications service initiation order records that correspond to respective ones of the plurality of telecommunications service initiation orders;
    generating a second data set that comprises at least part of the first data set and one or more labels that have been appended to at least some of the plurality of telecommunications service initiation order records; and
    automatically generating a summary of the status of the plurality of telecommunications service initiation orders from the second data set;
    wherein automatically generating a summary of the status of the plurality of telecommunications service initiation orders from the second data set comprises:
    importing the second data set into a spreadsheet application; and
    automatically generating within the spreadsheet application the summary of the status of the plurality of telecommunications service initiation orders based on at least some of the data from the second data set.

2. The method of claim 1, wherein the summary of the status of the plurality of telecommunications service initiation orders includes a summary of a number of service orders that are in respective ones of a plurality of possible processing stages and a summary of the status of the service orders at each processing stage with respect to facility assignments.

3. The method of claim 1, wherein the first data set is imported into a database application, and wherein the second data set is generated by the database application executing at least one query on the first data set.

4. The method of claim 3, wherein executing at least one query on the first data set to generate a second data set comprises executing a first composite query to generate an intermediate data set that comprises the first data set and the one or more labels that are appended to at least some of the plurality of telecommunications service initiation records in the first data set.

5. The method of claim 4, wherein executing at least one query on the first data set to generate a second data set further comprises executing a second composite query that removes fields from the intermediate data set to generate the second data set.

6. The method of claim 4, wherein the labels appended by the first composite query comprise English language labels.

7. The method of claim 1, wherein automatically generating within the spreadsheet application the summary of the status of the plurality of telecommunications service initiation orders based on at least some of the data from the second data set comprises using a pivot table to automatically generate the summary of the status of the plurality of telecommunications service initiation orders.

8. The method of claim 1, wherein the one or more labels that are appended to at least some of the plurality of telecommunications service initiation order records in the first data set are used by the spreadsheet application in generating the summary of the status of the plurality of telecommunications service initiation orders.

9. The method of claim 1, further comprising accepting user input via the spreadsheet application that specifies the portion of the data contained in the second data set that are included in the summary of the status of the plurality of telecommunications service initiation orders.

10. The method of claim 1, further comprising comparing how the summary of the status of the plurality of telecommunications service initiation orders has varied over time.

11. A system for summarizing a status of a plurality of telecommunications service initiation orders, comprising:
    a first data set resident in a memory storage device, the first data set having a plurality of elements that correspond to a plurality of telecommunications service initiation orders;
    a first application executing on a data processing system that performs at least one query using the elements of the first data set to generate a second data set having a plurality of elements that correspond to a subset of the plurality of elements in the first data set;
    a second application that processes data contained in the second data set to produce a summary of the status of at least some of the plurality of telecommunications service initiation orders; and
    wherein the at least one query comprises a first composite query that generates an intermediate data set that comprises the first data set and one or more labels that are appended to at least some of the plurality of records in the first data set and a second composite query that removes fields from the intermediate data set to generate the second data set.

12. The system of claim 11, wherein the first application comprises a database application, and wherein the second data set is automatically exported from the database application to the second application.

13. The system of claim 12, wherein the second application comprises a spreadsheet application, and wherein a pivot table in the spreadsheet application is used to produce the summary of the status of at least some of the plurality of telecommunications service initiation orders.

14. The system of claim 11, wherein at least some of the plurality of elements in the second data set include labels that were added by the first application that are used by the second application in producing the summary of the status of at least some of the plurality of telecommunications service initiation orders.

15. The system of claim 11, wherein the second application accepts user input to determine portions of the data contained in the second data set to summarize in producing the summary of the status of at least some of the plurality of telecommunications service initiation orders.

16. A computer program product for summarizing a status of a plurality of telecommunications service initiation orders, comprising:
    a computer readable medium having computer readable program code embodied therein, the computer readable program code comprising:
    computer readable program code that is configured to compile a first data set that includes a plurality of telecommunications service initiation order records that correspond to respective ones of the plurality of telecommunications service initiation orders;
    computer readable program code that is configured to generate a second data set that comprises at least part of the first data set and one or more labels that have been appended to at least some of the plurality of telecommunications service initiation order records; and computer readable program code that is configured to automatically generate a summary of the status of the plurality of telecommunications service initiation orders from the second data set by importing the second data set into a spreadsheet application and then automatically generating within the spreadsheet application the summary of the status of the plurality of telecommunications service initiation orders based on at least some of the data from the second data set.

17. The computer program product of claim 16, wherein the computer readable program code that is configured to automatically generate a summary of the status of the plurality of telecommunications service initiation orders from the second data set comprises computer readable program code that is configured to automatically generate a summary of a number of service orders that are in respective ones of a plurality of possible processing stages and a summary of the status of the service orders at each processing stage with respect to facility assignments.

18. The computer program product of claim 16, wherein the computer readable program code that is configured to generate a second data set that comprises at least part of the first data set and one or more labels that have been appended to at least some of the plurality of telecommunications service initiation order records comprises a database application that generates the second data set by executing at least one query on the first data set.

19. The computer program product of claim 18, wherein the computer readable program code that is configured to automatically generate a summary of the status of the plurality of telecommunications service initiation orders from the second data set comprises:

a pivot table within the spreadsheet application that automatically generates the summary of the status of the plurality of telecommunications service initiation orders based on at least some of the data from the second data set.

* * * * *